United States Patent
Shin (10) Patent No.: US 7,847,827 B2
(45) Date of Patent: Dec. 7, 2010

(54) METHOD AND APPARATUS FOR PHOTOGRAPHING AN OBJECT TO PRODUCE STILL IMAGE WHILE RECORDING MOVING PICTURE

(75) Inventor: Dae-Kyu Shin, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 336 days.

(21) Appl. No.: 11/869,379

(22) Filed: Oct. 9, 2007

(65) Prior Publication Data
US 2008/0084569 A1    Apr. 10, 2008

(30) Foreign Application Priority Data
Oct. 9, 2006    (KR) .................. 10-2006-0097971

(51) Int. Cl.
H04N 5/225    (2006.01)
(52) U.S. Cl. .................................. 348/220.1
(58) Field of Classification Search ............... 348/220.1
See application file for complete search history.

(56) References Cited

U.S. PATENT DOCUMENTS

| | | | |
|---|---|---|---|
| 6,172,672 B1 * | 1/2001 | Ramasubramanian et al. .... | 715/720 |
| 6,665,453 B2 * | 12/2003 | Scheurich ................... | 382/298 |
| 7,110,025 B1 * | 9/2006 | Loui et al. ............... | 348/220.1 |
| 7,388,605 B2 * | 6/2008 | Obrador .................. | 348/220.1 |
| 7,450,157 B2 * | 11/2008 | Obrador et al. .......... | 348/220.1 |
| 2002/0024602 A1 * | 2/2002 | Juen .......................... | 348/220 |
| 2002/0196348 A1 | 12/2002 | Kubo | |
| 2003/0090571 A1 * | 5/2003 | Scheurich ................ | 348/207.1 |
| 2003/0112340 A1 | 6/2003 | Okada et al. | |
| 2004/0051793 A1 | 3/2004 | Tecu et al. | |
| 2006/0268117 A1 * | 11/2006 | Loui et al. ............... | 348/220.1 |
| 2007/0229673 A1 * | 10/2007 | Araya et al. ............ | 348/220.1 |

* cited by examiner

Primary Examiner—James M Hannett
(74) Attorney, Agent, or Firm—The Farrell Law Firm, LLP (57) ABSTRACT

Provided is a method and apparatus for photographing an object to produce a still image while recording a moving picture. If a request for recording a moving picture is input by a user, image resolution of preview image data is changed to pre-set image resolution of moving picture data, moving picture data is generated by adjusting preview image data according to the changed image resolution, and the generated moving picture data is compressed and stored, if a request for photographing in the recording is input by the user, pausing of the moving picture recording is selected, the image resolution of preview image data is changed to pre-set image resolution of still image data in recording, still image data is generated by adjusting preview image data according to the changed image resolution, and the generated still image data is temporarily stored, if the photographing in the recording is terminated, pausing is released, the image resolution of preview image data is changed to the image resolution of moving picture data, moving picture data is generated by adjusting preview image data according to the changed image resolution, and the generated moving picture data is compressed and stored, and if a request for terminating the recording is input by the user, the temporarily stored still image data is compressed and stored. Accordingly, a still image can be produced while recording a moving picture.

9 Claims, 4 Drawing Sheets

FIG.1

PRIOR ART

METHOD AND APPARATUS FOR PHOTOGRAPHING AN OBJECT TO PRODUCE STILL IMAGE WHILE RECORDING MOVING PICTURE

PRIORITY

This application claims priority under 35 U.S.C. §119 to an application entitled "Method and Apparatus for Photographing Still Image While Recording Moving Picture" filed in the Korean Intellectual Property Office on Oct. 9, 2006 and assigned Serial No. 2006-97971, the contents of which are hereby incorporated by reference.

BACKGROUND OF THE INVENTION

1. Field of the Invention

The present invention relates generally to image processing, and in particular, to a method and apparatus for photographing a still image while recording a moving picture.

2. Description of the Related Art

Based on the development of communication technology, camera module technology and multimedia technology, a camera module is equipped in portable terminals so that moving pictures can be recorded and objects can be photographed to produce still images. In order to meet the expectations of the users, the service of photographing objects while recording moving pictures has been provided to portable terminals.

Figure 1:
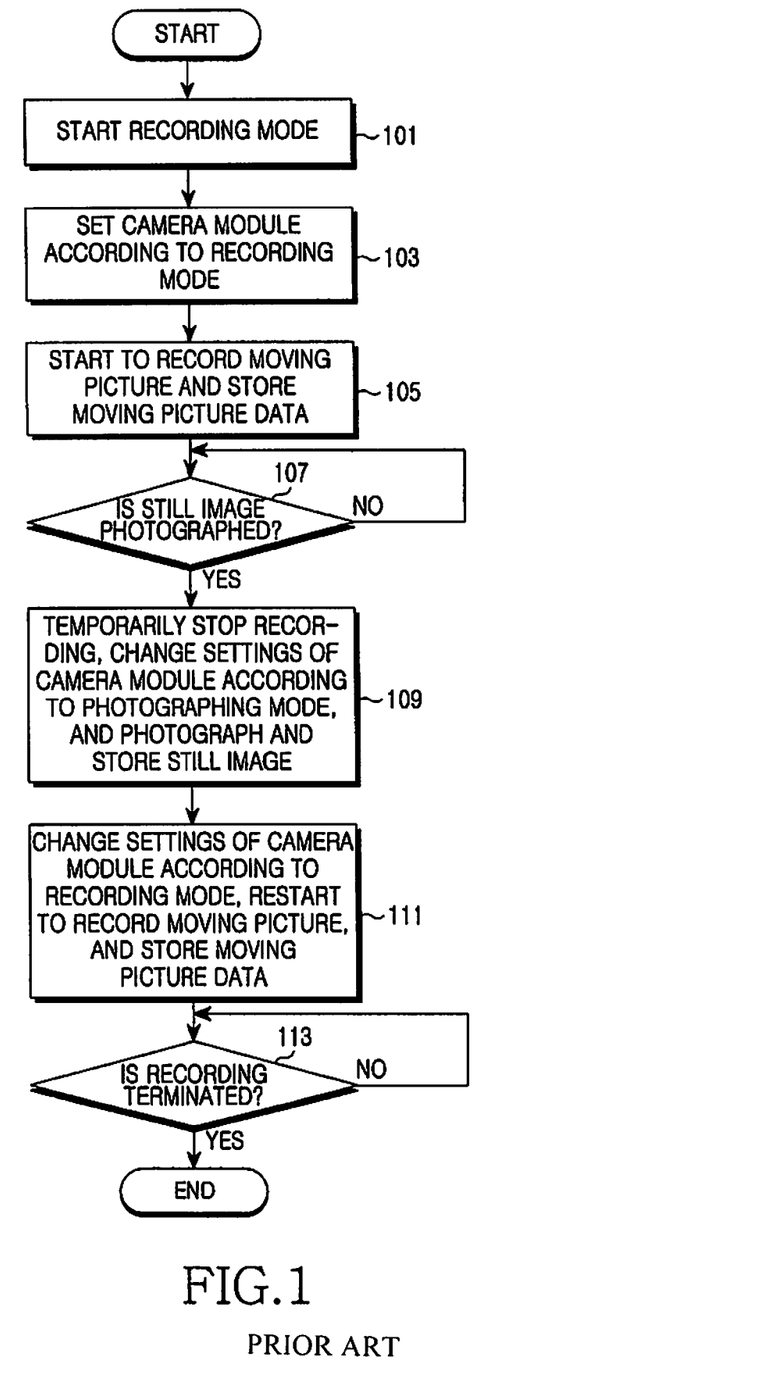
FIG. 1 is a flowchart illustrating a method of photographing an object while recording a moving picture in a conventional image device.

FIG. 1 is a flowchart illustrating a method of photographing an object while recording a moving picture in a conventional image device. Referring to FIG. 1, if a user requests a moving picture recording mode, the image device executes the moving picture recording mode in step 101. The image device operates a camera module according to pre-defined settings of the camera module in the moving picture recording mode in step 103 and displays on a display unit a preview image to be recorded. If the user requests to record a moving picture, the image device stores images displayed on the display unit in step 105. In this case, the image device compresses the moving picture data using a moving picture compression scheme, such as an MPEG (Motion Picture Editors Guild) scheme, and stores the compressed moving picture data.

The image device determines in step 107 if the user has input a request to photograph an object to produce a still image while recording the moving picture. If it is determined in step 107 that the user has not requested to photograph an object, the image device repeatedly performs step 107. If it is determined in step 107 that the user has input a request to photograph an object, the image device temporarily stops the recording and changes the operation mode of the camera module, according to pre-defined settings of the camera module, to a photographing mode in step 109. The image device photographs the object displayed on the display unit, compresses still image data produced by photographing the object using a still image compression scheme, such as a JPEG scheme, and stores the compressed still image data.

After photographing the objects, the image device changes the operation mode of the camera module, according to the pre-defined settings of the camera module, to the moving picture recording mode, records a moving picture displayed on the display unit, compresses moving picture data using the moving picture compression scheme, such as the MPEG scheme, and stores the compressed moving picture data in step 111. The image device determines in step 113 if the user has requested the termination of the recording. If it is determined in step 113 that the user has requested the termination of the recording, the image device stops storing the moving picture displayed on the display unit. If it is determined in step 113 that the user has not requested the termination of the recording, the image device continues to store the moving picture.

As illustrated in FIG. 1, the camera module changes image resolution settings of the preview image data when a still image is produced by photographing an object or when a moving picture is recorded, and generates preview image data according to the changed image resolution. For example, if the camera module supports the generation of still image data of 2 Mbytes, the camera module sets the image resolution to 800*600 while recording a moving picture, generates preview image data at the set image resolution, and outputs the generated preview image data. Thereafter, if the user inputs a request to photograph an object while recording the moving picture, the camera module sets the image resolution to 1600*1200, generates preview image data at the set image resolution, and outputs the generated preview image data. If the user terminates the photographing, the camera module sets the image resolution back to 800*600 generates preview image data at the set image resolution, and outputs the generated preview image data.

However, when the settings of the camera module are changed as illustrated in FIG. 1, the image device requires a delay time of around 1 second. Thus, when the user desires to photograph a current position of an object using the method illustrated in FIG. 1, the user may not be able to photograph the current position of the object due to the delay of the camera module.

SUMMARY OF THE INVENTION

An aspect of the present invention is to substantially solve at least the above problems and/or disadvantages and to provide at least the advantages below. Accordingly, an aspect of the present invention is to provide a method and apparatus for minimizing the delay time for photographing an object to produce a still image when the object is photographed while recording a moving picture.

Another aspect of the present invention is to provide a method and apparatus for photographing a current position of an object at an exact time desired by a user when the object is photographed while recording a moving picture.

According to one aspect of the present invention, there is provided a method of photographing an object to produce a still image while recording a moving picture, the method includes (a) if a request for recording the moving picture is input by a user, changing an image resolution of preview image data to pre-set image resolution of moving picture data, generating moving picture data by adjusting preview image data according to the changed image resolution, and compressing and storing the generated moving picture data; (b) if a request for photographing during the recording is input by the user, pausing the moving picture recording, changing the image resolution of preview image data to pre-set image resolution of still image data during recording, generating still image data by adjusting preview image data according to the changed image resolution, and temporally storing the generated still image data; (c) if the photographing during the recording is terminated, releasing the pause of the moving picture recording, changing the image resolution of preview image data to the image resolution of moving picture data, generating moving picture data by adjusting preview image data according to the changed image resolution, and compressing and storing the generated moving picture data; and (d) if a request for terminating the recording is input by the user, compressing and storing the temporarily stored still image data.

According to another aspect of the present invention, there is provided an apparatus for photographing an object to produce a still image while recording a moving picture, the apparatus including a camera module for generating and outputting preview image data at pre-set image resolution of the preview image data; a photographing/recording change unit; an image size converter for, if a recording request is received according to control of the photographing/recording change unit, changing a size conversion image resolution to pre-set a image resolution of moving picture data, generating moving picture data by adjusting the size of the preview image data according to the size conversion image resolution, and temporarily storing the generated moving picture data in a buffer, if a request for photographing in the recording is received, changing the size conversion image resolution to a pre-set image resolution of still image data during recording, generating still image data by adjusting the size of preview image data according to the size conversion image resolution, and temporarily storing the generated still image data in the buffer until the recording is terminated, and if the photographing in the recording is terminated, changing the size conversion image resolution to the image resolution of the moving picture data, generating moving picture data by adjusting the size of preview image data according to the size conversion image resolution, and temporarily storing the generated moving picture data in the buffer; and a controller for controlling the photographing/recording change unit according to the recording request, the request for photographing in the recording, and the termination of the photographing during the recording, which are input by the user, compressing and storing the moving picture data stored in the buffer in response to the recording request or the termination of the photographing during the recording, and reading the still image data from the buffer and compressing and storing the read still image data in response to a request for terminating the recording, which is input by the user.

BRIEF DESCRIPTION OF THE DRAWINGS

The above and other objects, features and advantages of the present invention will become more apparent from the following detailed description when taken in conjunction with the accompanying drawing in which.

DETAILED DESCRIPTION OF THE PREFERRED EMBODIMENT

Preferred embodiments of the present invention will be described herein below with reference to the accompanying drawings. In the following description, well-known functions or constructions are not described in detail since they would obscure the invention in unnecessary detail.

Figure 2:
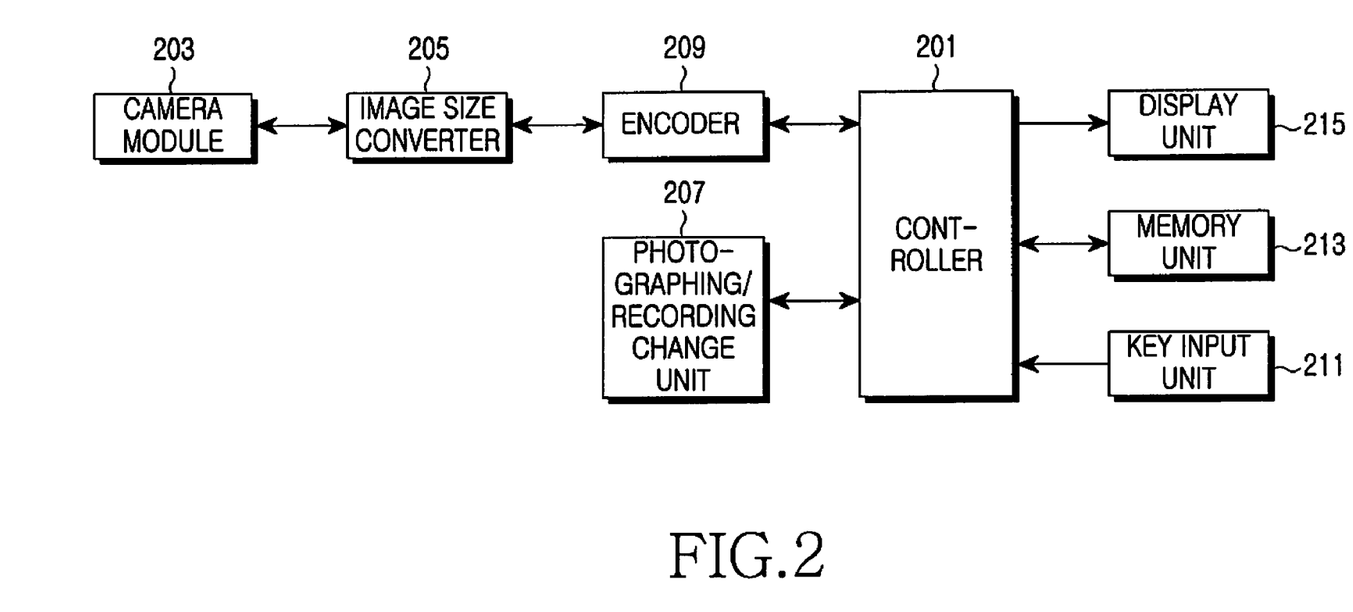
FIG. 2 is a block diagram of an image apparatus according to the present invention.

FIG. 2 is a block diagram of an image apparatus according to a preferred embodiment of the present invention.

Referring to FIG. 2, the image apparatus includes a controller 201, a camera module 203, an image size converter 205, a photographing/recording change unit 207, an encoder 209, a key input unit 211, a memory unit 213, and a display unit 215.

The controller 201 controls the camera module 203 to generate image data by photographing an inanimate object or a living object. In particular, when a moving picture is recorded, the camera module 203 generates preview image data according to pre-defined image resolution of the preview image data and outputs the generated preview image data to the image size converter 205.

The preview image data is image data generated by the camera module 203 digitizing an image projected through a lens during an operation of the camera module 203, and the image resolution of the preview image data depends on the performance of the camera module 203. For example, when the camera module 203 supports still image resolution of 2 Mbytes, the maximum image resolution of the still image data is 1600*1200. By setting the maximum image resolution of the moving picture data to half of the 1600 pixels that are horizontal pixels of the maximum image resolution of still image data, and to half of the 1200 pixels that are vertical pixels thereof, 800*600, that is ¼ the maximum image resolution of still image data can be set as the maximum image resolution of moving picture data. The camera module 203 may set the maximum image resolution of moving picture data as the image resolution of the preview image data. That is, when the maximum image resolution of moving picture data is 800*600, the camera module 203 may set the image resolution of the preview image data to 800*600. The image apparatus generates moving picture data or still image data by reducing or clipping the preview image data generated by the camera module 203, compresses the generated moving picture data or still image data, and stores the compressed moving picture data or still image data in the memory unit 213.

The image resolution indicates how many pixels are used to form the image data, and if the image resolution increases, when the image data is displayed, a clearer, sharper image can be displayed.

The image size converter 205 reduces or clips the preview image data according to an image resolution ratio of the preview image data and a pre-set size conversion image resolution ratio. The image size converter 205 includes a buffer (not shown) for temporarily storing moving picture data and still image data and stores the moving picture data and still image data in the buffer under the control of the controller 201.

The image size converter 205 reduces the preview image data if the image resolution ratio of the preview image data is the equal to the size conversion image resolution ratio, or clips the preview image data. For example, when preview image data of 800*600 pixels is converted to moving picture data of 320*240 pixels, since image resolution ratios of 800*600 and 320*240 are 4:3, the image size converter 205 may receive the preview image data of 800*600 pixels from the camera module 203, convert the preview image data of 800*600 pixels to moving picture data of 320*240 pixels by reducing image resolution of the preview image data, and output the converted moving picture data of 320*240 pixels to the encoder 209. For another example, when preview image data of 800*600 pixels is converted to moving picture data of 240*320 pixels, the image size converter 205 may clip the preview image data of 800*600 pixels to moving picture data of 450*600 pixels, convert the moving picture data of 450*600 pixels to moving picture data of 240*320 pixels by reducing image resolution of the moving picture data of 450*600 pixels, and output the converted moving picture data of 240*320 pixels to the encoder 209.

When the image size converter 205 receives preview image data and changes the image resolution of the received preview image data, the image size converter 205 changes the image resolution to pre-set image resolution. The pre-set image resolution is referred to as the size conversion image resolution.

In particular, when a moving picture is recorded, the image size converter 205 receives preview image data from the camera module 203, converts the image resolution of the received preview image data according to pre-set image resolution of moving picture data, and designates the converted preview image data as moving picture data. The image size converter 205 temporarily stores the moving picture data in the buffer. When an object is photographed to produce a still image while recording a moving picture, the image size converter 205 receives preview image data from the camera module 203, converts image resolution of the received preview image data according to image resolution of still image data, which is set within the pre-defined image resolution of preview image data, and designates the converted preview image data as still image data. The image size converter 205 temporarily stores the still image data in the buffer until the recording is terminated.

The photographing/recording change unit 207 sets requirements needed to photograph an object to produce a still image while recording a moving picture. That is, the photographing/recording change unit 207 may set image resolution of the still image data of a photographed object while recording a moving picture within image resolution of preview image data according to a request of a user. For example, when the image resolution of preview image data is 800*600, the photographing/recording change unit 207 can set the image resolution of still image data of a photographed object while recording a moving picture to 320*240, 640*480, 800*600, or 240*320 but not to 480*640. If the image resolution of still image data photographed in the recording is set to 800*600, when a request for photographing an object while in the recording mode is input to the image apparatus, the image apparatus can generate still image data having the image resolution of 800*600.

The photographing/recording change unit 207 can set the number of still images that can be generated while recording a moving picture. For example, if the maximum number of still imaged that can be generated while recording a moving picture is pre-set to 10, the photographing/recording change unit 207 can set the number of still images by selecting one of 1 to 10. If the number of still images that can be generated while recording a moving picture is set to 5, the image apparatus can photograph still images up to 5 times while recording a moving picture.

The photographing/recording change unit 207 can set the number of continuous still images generated while recording a moving picture. For example, if the maximum number of continuous still images generated while recording a moving picture is pre-defined to 5, the photographing/recording change unit 207 can set the number of continuous still images generated by selecting one of 1 to 5. If the number of continuous still images generated while recording a moving picture is set to 3, the image apparatus can continuously photograph an object 3 times when photographing of still images is requested while recording a moving picture.

The controller 201 controls the encoder 209 to receive moving picture data and still image data, compress the received moving picture data and still image data using a pre-defined compression scheme, and store the compressed moving picture data and still image data in the memory unit 213. In more detail, when a moving picture is recorded, the encoder 209 receives moving picture data from the buffer of the image size converter 205, compresses the received moving picture data using a compression scheme, such as an MPEG scheme, and outputs the compressed moving picture data to the controller 201 to store the compressed moving picture data in the memory unit 213. When a request for photographing an object to produce a still image is received while recording the moving picture, the encoder 209 stops receiving moving picture data from the buffer of the image size converter 205 because if the request for photographing an object to produce a still image is received while recording the moving picture, the image size converter 205 generates not moving picture data, but still image data. When the photographing is terminated while recording the moving picture, the encoder 209 receives moving picture data from the buffer of the image size converter 205, compresses the received moving picture data, and outputs the compressed moving picture data to the controller 201. When the user requests to terminate the recording after the still images were produced while recording the moving picture, the encoder 209 receives the still image data from the buffer of the image size converter 205, compresses the received still image data using a compression scheme, such as a JPEG scheme, and outputs the compressed still image data to the controller 201 to store the compressed still image data in the memory unit 213.

The key input unit 211 includes numeric keys (including a '*' key and a '#' key) for recording a moving picture and photographing an object to produce a still image and function keys for various functions, and generates a key input signal corresponding to a key selected by the user and outputs the generated key input signal to the controller 201.

The memory unit 213 stores data required to control the image apparatus. In particular, when a moving picture is recorded, the memory unit 213 stores compressed moving picture data received from the encoder 209. If a request for photographing an object to produce a still image is received while recording the moving picture, the memory unit 213 cannot receive compressed moving picture data from the encoder 209. When the photographing is terminated while recording the moving picture, the memory unit 213 stores compressed moving picture data received from the encoder 209. When the user requests a termination of the recording after still images were generated while recording the moving picture, the memory unit 213 stores compressed still image data received from the encoder 209.

The controller 201 controls the display unit 215 to display a current state of the image apparatus, an operational state of the image apparatus, and image data, and in general, the display unit 215 may include a Liquid Crystal Display (LCD) or Organic Light Emitting Diodes (OLEDs).

The controller 201 controls the image apparatus to perform various functions embedded in the image apparatus. In particular, if a request for photographing an object to produce a still image is input by the user while recording a moving picture, the controller 201 controls the image size converter 205 to generate still image data with pre-defined image resolution of still image data during recording. In more detail, if a request for recording a moving picture is input by the user, the controller 201 controls the photographing/recording change unit 207 to set size conversion image resolution of the image size converter 205 as pre-set image resolution of moving picture data. The image size converter 205 receives preview image data from the camera module 203, generates moving picture data by adjusting the size of the preview image data according to the size conversion image resolution, and temporarily stores the generated moving picture data in the buffer of the image size converter 205. The controller 201 detects the moving picture data from the buffer of the image size converter 205 and outputs the detected moving picture data to the encoder 209. The controller 201 controls the encoder 209 to compress the moving picture data using a pre-defined compression scheme. The controller 201 detects the compressed moving picture data from the encoder 209 and stores the detected moving picture data in the memory unit 213. If a request for photographing during the recording is input by the user, the controller 201 temporarily stops recording the moving picture. The controller 201 controls the photographing/recording change unit 207 to set the size conversion image resolution of the image size converter 205 as pre-set image resolution of still image data in recording. The image size converter 205 receives preview image data from the camera module 203, generates still image data by adjusting the size of the preview image data according to the size conversion image resolution, and temporarily stores the generated still image data in the buffer of the image size converter 205 until the recording is terminated by the user. If a continuous shooting function is activated, the image size converter 205 can receive preview image data from the camera module 203 and continuously generates still image data corresponding to the pre-defined number of continuous shots.

If the photographing during the recording is terminated, the controller 201 controls the photographing/recording change unit 207 to set the size conversion image resolution of the image size converter 205 as the pre-set image resolution of moving picture data and restarts to record the moving picture. The image size converter 205 receives preview image data from the camera module 203, generates moving picture data by adjusting the size of the preview image data according to the size conversion image resolution, and temporarily stores the generated moving picture data in the buffer of the image size converter 205. The controller 201 detects the moving picture data from the buffer of the image size converter 205 and outputs the detected moving picture data to the encoder 209. The controller 201 controls the encoder 209 to compress the moving picture data using the pre-defined compression scheme. The controller 201 detects the compressed moving picture data from the encoder 209 and stores the detected moving picture data in the memory unit 213. In this case, the controller 201 may store the currently generated moving picture data to be stored immediately subsequent to the moving picture data stored before the photographing in the recording was requested by the user. If a request for terminating the recording is input by the user, the controller 201 terminates the recording, detects the temporarily stored still image data from the buffer of the image size converter 205, outputs the detected still image data to the encoder 209, and controls the encoder 209 to compress the still image data using the pre-defined compression scheme. The controller 201 detects the compressed still image data from the encoder 209 and stores the detected still image data in the memory unit 213.

If the user photographs an object to produce a still image while recording the moving picture, the controller 201 controls the image apparatus not to allow the user to photograph objects more frequently than the pre-set number of still image generations. If the user requests to photograph a still image after using the pre-set number of still image generations, the controller 201 may inform the user that the user has used the pre-set number of still image generations.

Operations of the components of the image apparatus have been described with reference to FIG. 2. A method of setting and executing a photographing-in-recording setting mode will now be described with reference to FIGS. 3 and 4.

Figure 3:
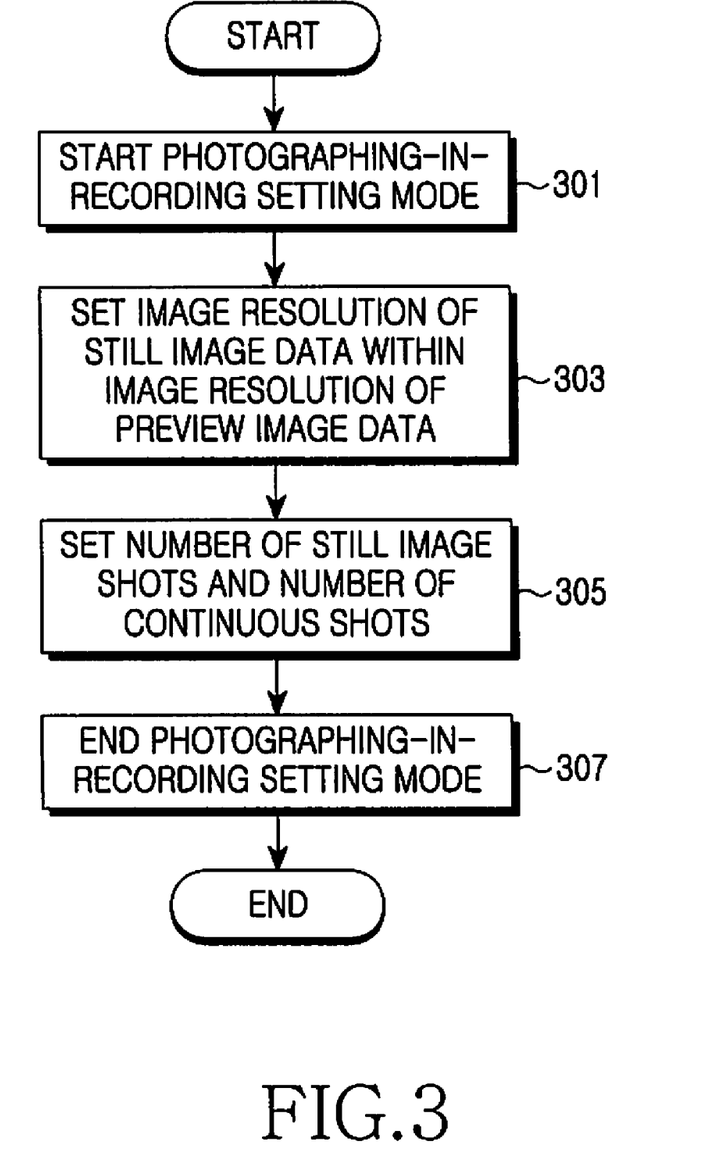
FIG. 3 is a flowchart illustrating a method of setting image resolution of an object photographed while recording a moving picture according to the present invention.

FIG. 3 is a flowchart illustrating a method of the setting image resolution of a still image of an object photographed while recording a moving picture according to a preferred embodiment of the present invention. A process of executing the photographing-in-recording setting mode when still image data is generated while recording a moving picture will now be described with reference to FIGS. 2 and 3.

If the photographing-in-recording setting mode is requested by a user, the controller 201 controls the photographing/recording change unit 207, which can set requirements needed to photograph an object to produce a still image while recording a moving picture, to execute the photographing-in-recording setting mode in step 301. In order to simplify the description of the current embodiment of the present invention, it is assumed that the requirements that are set are image resolution of still image data in recording, the number of still images generated, and the number of continuous images generated.

The controller 201 controls the photographing/recording change unit 207 to set the image resolution of still image data during recording in step 303. Herein, the image resolution of still image data during recording must be within the image resolution of preview image data.

The controller 201 controls the photographing/recording change unit 207 to set the number of still images generated in step 305. The photographing/recording change unit 207 can set the number of still images generated so as not to exceed the pre-defined maximum number of still images generated. The maximum number of still images generated is the maximum number of images generated where still images of objects can be photographed while recording the moving picture.

The controller 201 also controls the photographing/recording change unit 207 to set the number of images generated in step 305. Herein, the photographing/recording change unit 207 can set the number of images generated so as not to exceed the pre-defined maximum number of images generated. The maximum number of images generated is the maximum number of times where still images can be continuously generated once a request for photographing an object to produce a still image is input while recording the moving picture. For example, if the maximum number of images generated is 5, the photographing/recording change unit 207 can set the number of images generated to one of 1 to 5, so as not to exceed 5.

The controller 201 also controls the photographing/recording change unit 207 to terminate the photographing-in-recording setting mode in step 307.

The image resolution of still image data during recording, the number of still images generated, and the number of continuous images generated are referred to as photographing-in-recording settings. Since the photographing-in-recording settings are defined by the capacity of the memory unit 213 and the processing speed of still image data, if relevant technologies are developed, the image resolution of still image data during recording, the number of still images generated, and the number of continuous images generated can increase.

Figure 4:
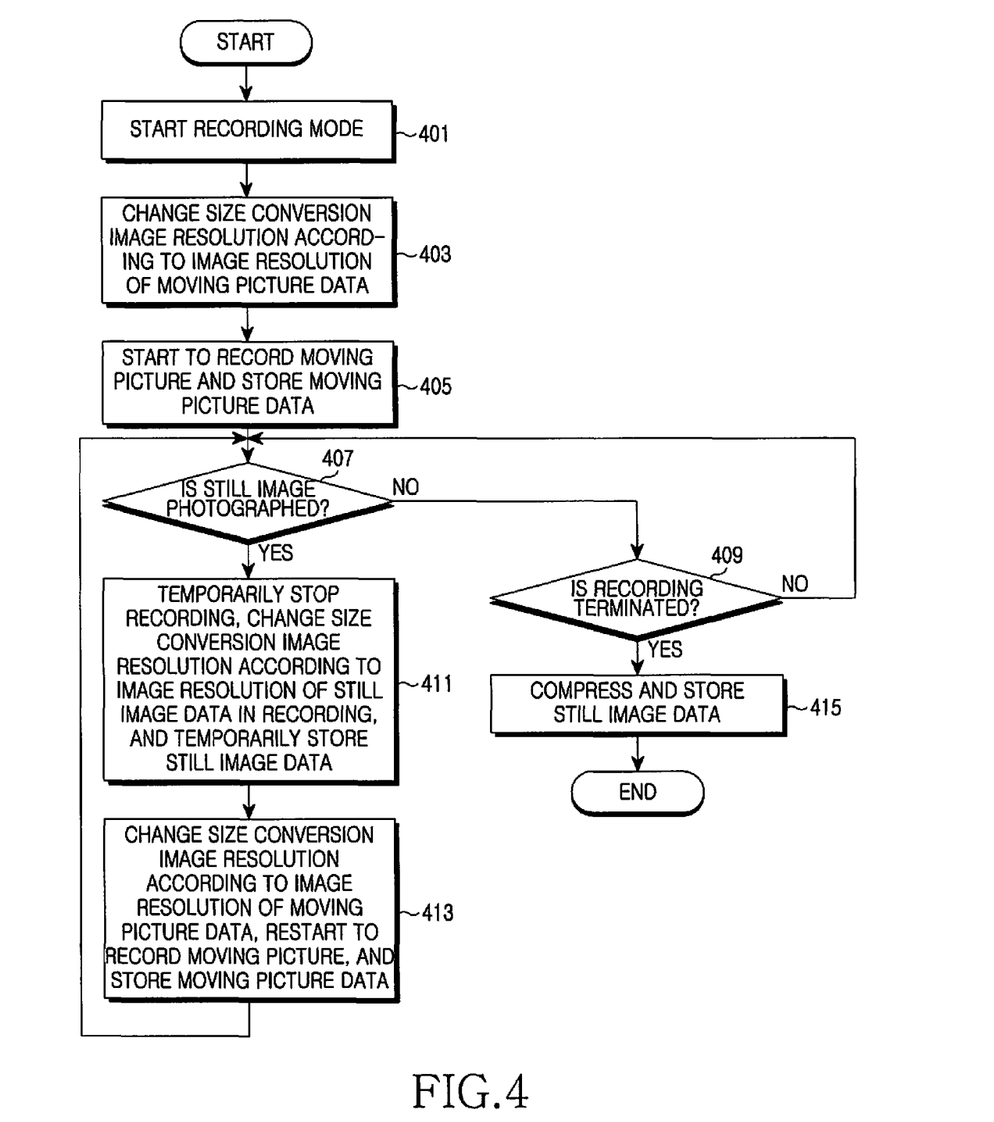
FIG. 4 is a flowchart illustrating a method of photographing an object while recording a moving picture according to the present invention.

FIG. 4 is a flowchart illustrating a method of photographing an object to produce a still image while recording a moving picture according to a preferred embodiment of the present invention. The method of photographing an object to produce a still image while recording a moving picture will now be described with reference to FIGS. 2 and 4.

It is assumed that by executing the photographing-in-recording setting mode, image resolution of still image data during recording is set to 800*600, the number of still images generated is set to 10, and the number of continuous images generated is set to 1.

In order to simply describe the current embodiment, it is assumed that image resolution of preview image data is set to 800*600, image resolution of moving picture data is set to 320*240, and the image size converter 205 includes a buffer (not shown) for temporarily storing image data. It is assumed that the buffer of the image size converter 205 includes a moving picture storing area for temporarily storing moving picture data and a still image storing area for temporarily storing still image data.

If a request for recording a moving picture is input by a user, the controller 201 begins a moving picture recording mode in step 401.

The controller 201 sets the pre-set image resolution of moving picture data as size conversion image resolution of the image size converter 205 in step 403. For example, if the pre-set image resolution of moving picture data is set to 320*240, the controller 201 can set the size conversion image resolution of the image size converter 205 to 320*240. The image size converter 205 previously defines the moving picture storing area, in which moving picture data having the image resolution 320*240 is stored, in the buffer thereof.

If starting of the recording is requested by the user, the controller 201 controls the camera module 203 and the image size converter 205 to store moving picture data in the memory unit 213 in step 405.

In more detail, the camera module 203 generates an image projected through a lens as preview image data and outputs the generated preview image data to the image size converter 205. The image size converter 205 generates moving picture data by converting the image resolution of preview image data set to 800*600 to the image resolution of moving picture data pre-set to 320*240, and temporarily stores the generated moving picture data in the moving picture storing area of the buffer of the image size converter 205. The encoder 209 receives the moving picture data form the buffer of the image size converter 205, compresses the received moving picture data, and stores the compressed moving picture data in the memory unit 213. Herein, the controller 201 may store the moving picture data in the memory unit 213 in a moving picture format, such as MPEG or Audio Video Interleave (AVI), according to a compression scheme of the encoder 209.

If a request for photographing an object to produce a still image is input by the user in step 407, the controller 201 proceeds to step 411, and if a request for photographing an object to produce a still image is not input by the user in step 407, the controller 201 proceeds to step 409.

The controller 201 temporarily stops recording the moving picture and controls the image size converter 205 to generate still image data and temporarily store the generated still image data in the still image storing area of the buffer of the image size converter 205 in step 411.

In more detail, the controller 201 changes the state of the image size converter 205 to a standby state and sets photographing-in-recording settings pre-set by the photographing/recording change unit 207 in the image size converter 205.

The photographing-in-recording settings may be image resolution of still image data in recording, the number of still images generated, and the number of continuous images generated. For example, if the pre-set image resolution of still image data in recording is 800*600, the controller 201 can set the size conversion image resolution of the image size converter 205 to 800*600. The controller 201 can control the image size converter 205 to pre-define the still image storing area, in which still image data having the image resolution 800*600 is temporarily stored, in the buffer of the image size converter 205. The controller 201 also can control the image size converter 205 to set the number of still images which can be stored in the still image storing area of the buffer of the image size converter 205, to the pre-set number of still images generated. The controller 201 also can control the image size converter 205 to set the number of still images, which can be continuously stored in the still image storing area of the buffer of the image size converter 205, to the pre-set number of continuous images generated.

The image size converter 205 receives preview image data from the camera module 203. The image size converter 205 generates still image data by converting image resolution of the preview image data to the pre-set size conversion image resolution and temporarily stores the generated still image data in the still image storing area of the buffer thereof until a request for terminating the moving picture is input by the user. For example, if the image resolution of the preview image data is 800*600, and if the image resolution of still image data in recording is 800*600, the image size converter 205 can generate still image data without converting the image resolution of the preview image data and temporarily store the generated still image data in the still image storing area of the buffer thereof. As another example, if the image resolution of the preview image data is 800*600, and if the image resolution of still image data in recording is 640*480, the image size converter 205 can generate still image data by converting the image resolution of the preview image data to 640*480 and temporarily store the generated still image data in the still image storing area of the buffer thereof until a request for terminating the moving picture is input by the user.

If the number of continuous images generated is 2, the image size converter 205 receives preview image data, converts the image resolution of the preview image data to the size conversion image resolution, and temporarily stores the converted preview image data in the still image storing area of the buffer thereof. The image size converter 205 receives preview image data once more, converts the image resolution of the preview image data to the size conversion image resolution, and temporarily stores the converted preview image data in the still image storing area of the buffer thereof. That is, when a request for photographing an object to produce a still image while recording the moving picture is input by the user once, the image size converter 205 generates still image data corresponding to the number of continuous images generated and temporarily stores the generated still image data in the still image storing area of the buffer thereof.

If the photographing during the recording is terminated, the controller 201 controls the image size converter 205 to generate moving picture data, compress the generated moving picture data, and store the compressed moving picture data in the memory unit 213 in step 413 and proceeds to step 407.

In more detail, if the photographing during the recording is terminated, the controller 201 changes the state of the image size converter 205 to the standby state. The controller 201 sets the pre-set image resolution of moving picture data set by the photographing/recording change unit 207 as the size conversion image resolution of the image size converter 205. The image size converter 205 changes settings to store moving picture data in the moving picture storing area of the buffer thereof.

The controller 201 restarts to record the moving picture. The controller 201 controls the image size converter 205 to receive preview image data from the camera module 203. The image size converter 205 generates moving picture data by converting image resolution of the preview image data to the pre-set size conversion image resolution and temporarily stores the generated moving picture data in the moving picture storing area of the buffer thereof. The controller 201 reads the moving picture data from the buffer of the image size converter 205 and outputs the read moving picture data to the encoder 209. The controller 201 controls the encoder 209 to compress the moving picture data using the pre-defined compression scheme.

The controller 201 detects the compressed moving picture data from the encoder 209 and stores the detected moving picture data in the memory unit 213. The controller 201 can store the currently compressed moving picture data to be stored immediately subsequent to the compressed moving picture data stored before the photographing during the recording was requested by the user. Thereafter, the controller 201 proceeds to step 407.

If a request for terminating the recording is not input by the user in step 409, the controller 201 proceeds to step 407 to continue the recording. If a request for terminating the recording is input by the user in step 409, the controller 201 proceeds to step 415.

The controller 201 stops and terminates the recording in step 415. The controller 201 creates full moving picture data by compressing moving picture data stored in the buffer of the image size converter 205 and storing the compressed moving picture data in the memory unit 213. If the photographing during the recording was performed, the controller 201 detects the stored still image data from the buffer of the image size converter 205 and outputs the detected still image data to the encoder 209. The controller 201 controls the encoder 209 to compress the still image data using the pre-defined compression scheme. The controller 201 detects the compressed still image data from the encoder 209 and stores the detected still image data in the memory unit 213.

As described above, if a request for photographing an object to produce a still image is input by the user while recording a moving picture, the image apparatus can generate still image data within pre-set image resolution of preview image data without terminating the recording of the moving picture. When a still image of a photographed object is generated while a moving picture is being recorded, in the prior art, a delay time of more than 1 second occurs when settings are changed from a moving picture mode of a camera module to a still image mode. However, according to the present invention, since still image data is generated by changing settings of the image size converter 205 without changing settings of the camera module 203, only a delay time of 0.3~0.4 seconds occurs. Thus, according to the present invention, when a still image of a photographed object is generated while a moving picture is being recorded, still image data can be generated with a delay time less than that of the prior art. Thus, a user can photograph a desired pose of an object. The image apparatus according to the present invention is included in portable terminals and digital cameras so that users can easily carry the portable terminals and the digital cameras and photograph objects to produce still images while recording a moving picture.

As described above, according to the present invention, when a still image is produced from photographed object while a moving picture is being recorded, still image data can be generated with a delay time less than that of the prior art, and thus, a user can photograph a desired pose of an object.

While the invention has been shown and described with reference to a certain preferred embodiment thereof, it will be understood by those skilled in the art that various changes in form and details may be made therein without departing from the spirit and scope of the invention. For example, although the photographing-in recording settings are defined as the image resolution of still image data in recording, the number of still images generated, and the number of continuous images generated in a preferred embodiment of the present invention, a brightness change for changing the brightness of a still image, a screen rotation for rotating a still image, and a screen background for changing a background image of a still image, can be further included in the photographing-in recording settings. Thus, the spirit and scope of the invention may be defined by the appended claims.

What is claimed is:

1. A method of photographing an object to produce a still image while recording a moving picture, the method comprising:

(a) if a request for recording the moving picture is input by a user, changing an image resolution of preview image data to a pre-set image resolution of moving picture data, generating moving picture data according to the changed image resolution of the moving picture, and compressing the generated moving picture data and storing the compressed moving picture data;

(b) if a request for photographing during the recording is input by the user, changing the image resolution to a pre-set image resolution of still image data during recording, generating still image data according to the changed image resolution of the still image, and storing the generated still image data;

(c) if the photographing is terminated, releasing the pause of the moving picture recording, changing the image resolution of the still image to the image resolution of moving picture data, generating moving picture data according to the changed image resolution, and compressing the generated moving picture data according to the changed image resolution and storing the compressed moving picture; and (d) if a request for terminating the recording is input by the user, compressing the generated still image data and storing the compressed still image data;

wherein the image resolution of the still image data during recording is set to be greater than or equal to the image resolution of the preview image data; and wherein the pre-set image resolution of the moving picture data is lower than the pre-set image resolution of the still image data.

2. The method of claim 1, wherein the storing of the generated still image data comprises generating still image data corresponding to a set number of continuous images that can be generated and storing the generated still image data.

3. The method of claim 2, wherein if a request for photographing during the recording is input by the user a second time, repeating steps (b) and (c).

4. The method of claim 3, wherein the repeating process is performed within a set number of still images that can be generated.

5. An apparatus for photographing an object to produce a still image while recording a moving picture, the apparatus comprising:

a camera module for generating and outputting preview image data at pre-set image resolution of the preview image data;

a photographing/recording change unit;

an image size converter for, if a recording request is received according to control of the photographing/recording change unit, changing a size conversion image resolution to a pre-set image resolution of moving picture data, generating moving picture data according to the size conversion image resolution of the moving picture, compressing the generated moving picture data and temporarily storing the compressed moving picture data in a buffer, if a request for photographing during the recording is received, changing the size conversion image resolution to pre-set image resolution of the still image data during recording, generating still image data according to the size conversion image resolution of the still image, and temporarily storing the generated still image data in the buffer until the recording is terminated, and if the photographing during the recording is terminated, changing the size conversion image resolution to the image resolution of moving picture data, generating moving picture data according to the size conversion image resolution, compressing the generated moving picture data according to the changed image resolution, and temporarily storing the generated moving picture data in the buffer; and a controller for controlling the photographing/recording change unit according to the recording request, the request for photographing during the recording, and the termination of the photographing during the recording, which are input by the user, compressing the generated moving picture data and storing the compressed moving picture data stored in the buffer in response to the recording request or the termination of the photographing in the recording, and reading the still image data from the buffer and compressing the generated still image data and storing the compressed read still image data in response to a request for terminating the recording, which is input by the user;

wherein the image resolution of the still image data during recording is set to be greater than or equal to the image resolution of the preview image data; and wherein the pre-set image resolution of the moving picture data is lower than the pre-set image resolution of the still image data.

6. The apparatus of claim 5, wherein if the request for photographing during the recording is received, the image size converter generates still image data corresponding to a set number of continuous images that can be generated and temporarily stores the generated still image data.

7. The apparatus of claim 5, wherein the controller, if the recording request is input by the user, controls the photographing/recording change unit to change the size conversion image resolution to the image resolution of the moving picture data, receives moving picture data from the buffer, compresses the received moving picture data, and stores the compressed moving picture data, if the request for photographing in the recording is input by the user, temporarily stops recording the moving picture and controls the photographing/recording change unit to change the size conversion image resolution to the image resolution of the still image data during recording, if the photographing in the recording is terminated, controls the photographing/recording change unit to change the size conversion image resolution to the image resolution of the moving picture data, releases the pause, receives moving picture data from the buffer, compresses the received moving picture data, and stores the compressed moving picture data, and if the request for terminating the recording is input by the user, terminates the recording, receives the still image data from the buffer, compresses the received still image data, and stores the compressed still image data.

8. The apparatus of claim 7, wherein if a request for photographing during the recording is input by the user a second time, the controller temporarily stops recording the moving picture and controls the photographing/recording change unit so that the image size converter generates the still image data.

9. The apparatus of claim 8, wherein if the request for photographing during the recording is input by the user a third time during a set number of still images that can be generated, the controller generates the still image data.

\* \* \* \* \*